United States Patent
Carroll et al.

(10) Patent No.: US 8,763,407 B2
(45) Date of Patent: Jul. 1, 2014

(54) MAGNETO-CALORIC HEAT PUMP WITH THE USE OF A CASCADE OF MAGNETO-CALORIC MATERIALS

(75) Inventors: Colman Carroll, Mannheim (DE); Olaf Rogge, Dackenheim (DE); Bennie Reesink, Winterswijk-Kotten (NL)

(73) Assignee: BASF SE, Ludwigshafen (DE)

( * ) Notice: Subject to any disclaimer, the term of this patent is extended or adjusted under 35 U.S.C. 154(b) by 848 days.

(21) Appl. No.: 12/852,813

(22) Filed: Aug. 9, 2010

(65) Prior Publication Data

US 2011/0094243 A1    Apr. 28, 2011

(30) Foreign Application Priority Data

Aug. 10, 2009  (EP) .................... 09167550

(51) Int. Cl.
F25B 21/00    (2006.01)
(52) U.S. Cl.
USPC .................... 62/3.1; 62/3.3; 62/335
(58) Field of Classification Search
CPC .......... F25B 21/00; F25B 21/02; F25B 9/006; F25B 21/04; F25B 27/00; F25B 9/14; F23L 15/02; Y02B 30/66; Y02B 30/62; A01J 9/04
USPC .......... 62/3.1, 3.3, 335, 238.1, 324.2, 6, 114; 165/136, 185, 4; 29/890.03, 890.035
See application file for complete search history.

(56) References Cited

U.S. PATENT DOCUMENTS

| 4,332,135 | A | 6/1982 | Barclay et al. |
| 4,702,090 | A * | 10/1987 | Barclay et al. .................... 62/3.3 |
| 4,829,770 | A | 5/1989 | Hashimoto |
| 5,124,215 | A | 6/1992 | Hashimoto |
| 6,526,759 | B2 * | 3/2003 | Zimm et al. ...................... 62/3.1 |
| 6,589,366 | B1 | 7/2003 | Gschneidner, Jr. et al. |
| 6,676,772 | B2 * | 1/2004 | Saito et al. .................... 148/301 |
| 6,758,046 | B1 * | 7/2004 | Barclay et al. .................... 62/3.1 |
| 7,076,958 | B2 * | 7/2006 | Saito et al. ....................... 62/3.1 |

(Continued)

FOREIGN PATENT DOCUMENTS

| EP | 1 736 717 A1 | 12/2006 |
| WO | WO 2004/068512 A1 | 8/2004 |
| WO | WO 2008/099234 A1 | 8/2008 |

OTHER PUBLICATIONS

Aru Yan "Structure and Magnetocaloric Effect in Melt-Spun $La(Fe,Si)_{13}$ and MnFePGe Compounds", Rare Metals, vol. 25, Oct. 2006, pp. 544-549.

(Continued)

*Primary Examiner* — Mohammad M Ali
(74) *Attorney, Agent, or Firm* — Oblon, Spivak, McClelland, Maier & Neustadt, L.L.P.

(57) ABSTRACT

A heat exchanger bed is formed from a cascade of at least three different magnetocaloric materials with different Curie temperatures, which are arranged in succession by ascending or descending Curie temperature and are preferably isolated from one another by intermediate thermal and/or electrical insulators, the difference in the Curie temperatures of adjacent magnetocaloric materials being 0.5 to 6° C.

15 Claims, 4 Drawing Sheets

(56) References Cited

U.S. PATENT DOCUMENTS

| | | | |
|---|---|---|---|
| 2002/0053209 A1* | 5/2002 | Zimm et al. | 62/3.1 |
| 2003/0051774 A1* | 3/2003 | Saito et al. | 148/302 |
| 2003/0221750 A1 | 12/2003 | Pecharsky et al. | |
| 2004/0093877 A1 | 5/2004 | Wada et al. | |
| 2005/0000230 A1* | 1/2005 | Saito et al. | 62/3.1 |
| 2007/0186560 A1* | 8/2007 | Schauwecker et al. | 62/3.1 |
| 2008/0078476 A1* | 4/2008 | Saito et al. | 148/328 |
| 2008/0216484 A1* | 9/2008 | Tsuji et al. | 62/3.3 |
| 2008/0276623 A1* | 11/2008 | Ali et al. | 62/3.1 |
| 2009/0217675 A1 | 9/2009 | Kobayashi et al. | |
| 2010/0047527 A1 | 2/2010 | Katter | |

OTHER PUBLICATIONS

D.T. Cam Thanh, et al., "Magnetocaloric Effect in MnFe(P,Si,Ge) Compounds", Journal of Applied Physics 99, 08Q107, 2006, pp. 1-3.

E. Brück, et al. "Magnetic Refrigeration-Towards Room-Temperature Applications", Physica B 327, 2003, pp. 431-437.

U.S. Appl. No. 12/852,750, filed Aug. 9, 2010, Reesink.

U.S. Appl. No. 12/984,080, filed Jan. 4, 2011, Reesink, et al.

Nature, vol. 415, No. 10, Jan. 2002, 4 pages.

International Search Report issued Sep. 22, 2010, in PCT/EP2010/061025.

* cited by examiner

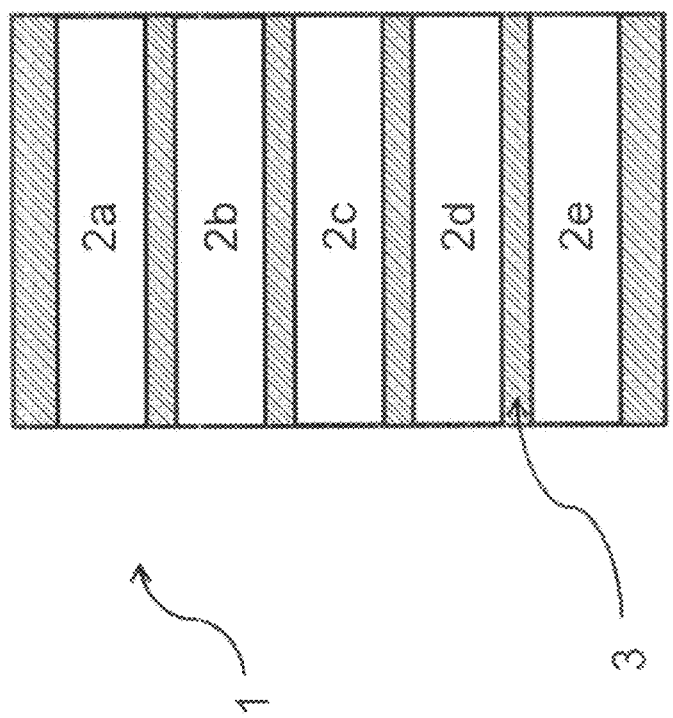

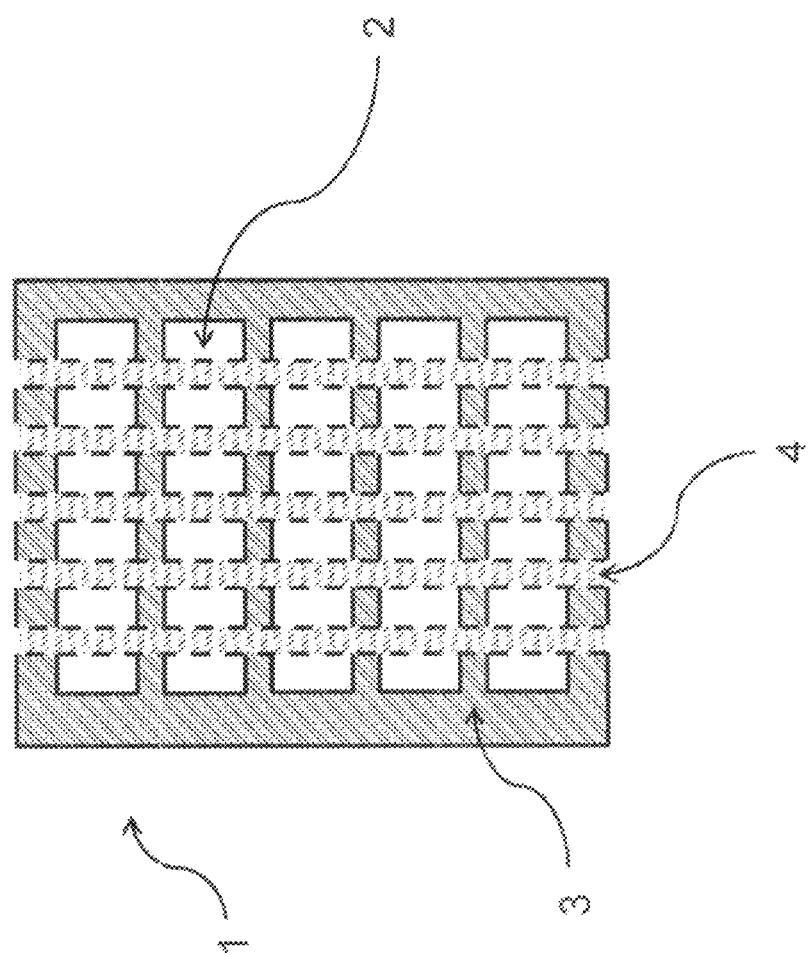

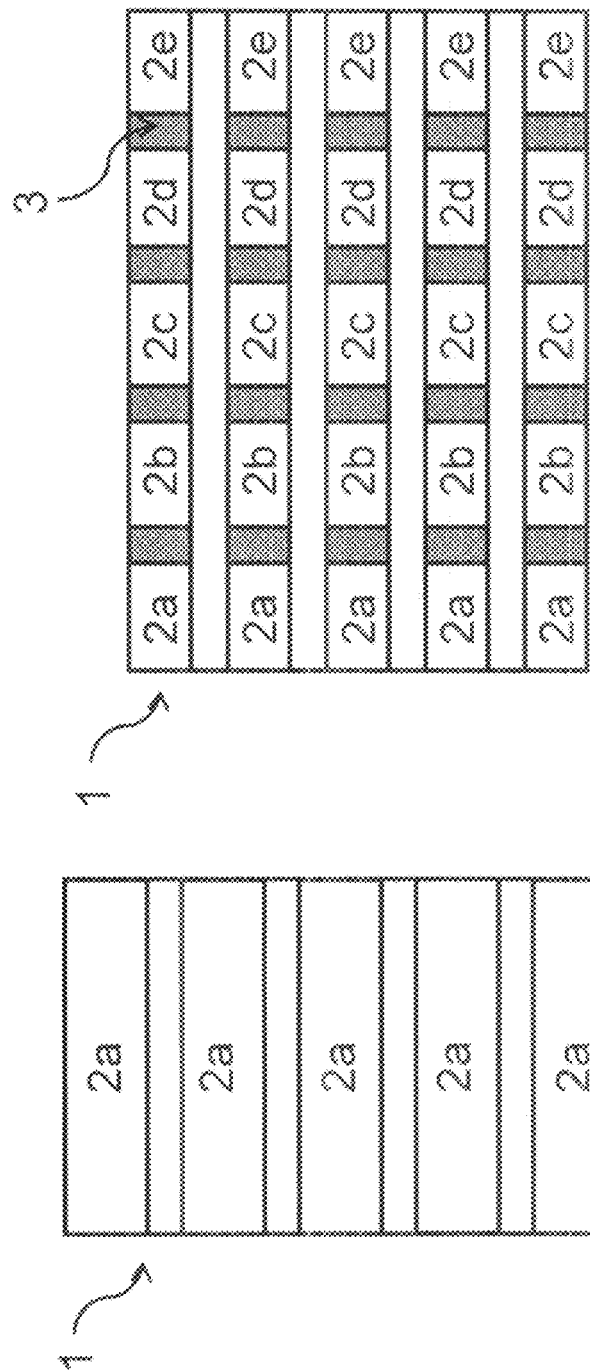

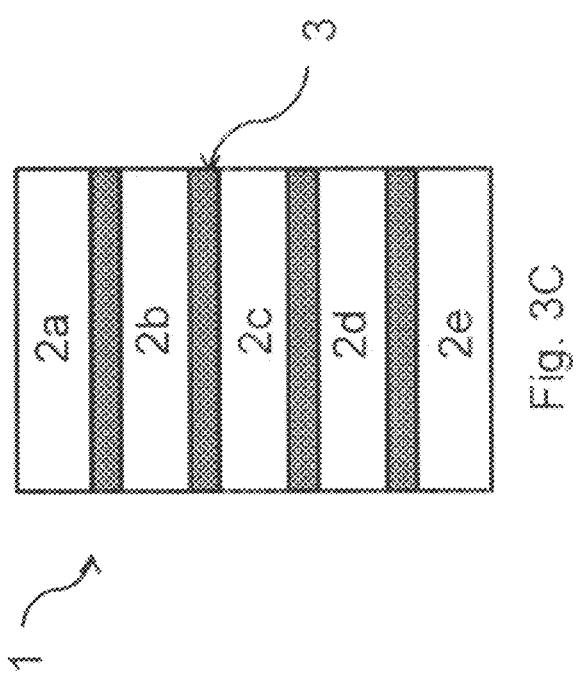

MAGNETO-CALORIC HEAT PUMP WITH THE USE OF A CASCADE OF MAGNETO-CALORIC MATERIALS

The invention relates to a heat exchanger bed composed of a cascade of magnetocaloric materials, to processes for production thereof and to the use thereof in refrigerators, air conditioning units, heat pumps or in power generation by direct conversion of heat.

Such materials are known in principle and are described, for example, in WO 2004/068512. Magnetic cooling techniques are based on the magnetocaloric effect (MCE) and may constitute an alternative to the known vapor circulation cooling methods. In a material which exhibits a magnetocaloric effect, the alignment of randomly aligned magnetic moments by an external magnetic field leads to heating of the material. This heat can be removed from the MCE material to the surrounding atmosphere by a heat transfer. When the magnetic field is then switched off or removed, the magnetic moments revert back to a random arrangement, which leads to cooling of the material below ambient temperature. This effect can be exploited for cooling purposes; see also Nature, Vol. 415, Jan. 10, 2002, pages 150 to 152. Typically, a heat transfer medium such as water is used for heat removal from the magnetocaloric material.

The materials used in thermomagnetic generators are likewise based on the magnetocaloric effect. In a material which exhibits a magnetocaloric effect, the alignment of randomly aligned magnetic moments by an external magnetic field leads to heating of the material. This heat can be released by the MCE material into the surrounding atmosphere by a heat transfer. When the magnetic field is then switched off or removed, the magnetic moments revert back to a random alignment, which leads to cooling of the material below ambient temperature. This effect can be exploited firstly for cooling purposes, and secondly for conversion of heat to electrical energy.

The magnetocaloric generation of electrical energy is associated with magnetic heating and cooling. At the time of first conception, the process for energy generation was described as pyromagnetic energy generation. Compared to devices of the Peltier or Seebeck type, these magnetocaloric devices can have a significantly higher energy efficiency.

The research into this physical phenomenon began in the late 19$^{th}$ century, when two scientists, Tesla and Edison, filed a patent on pyromagnetic generators.

For the thermomagnetic or magnetocaloric applications, the material should permit efficient heat exchange in order to be able to achieve high efficiencies. Both in the course of cooling and in the course of power generation, the thermomagnetic material is used in a heat exchanger.

The use of a plurality of different magnetocaloric materials in one heat pump unit is known per se. EP-A-1 736 717 describes a continuously rotary magnetic refrigerator and a heat pump. In this case, four rotary magnetic coolers or heat pumps with cylindrical structures can be combined in a series. The warm side of the first refrigerator is connected to the cold side of the second refrigerator, etc. Each stage of the cascade system may comprise different magnetocaloric materials. A corresponding configuration is shown in FIG. 7A.

US 2009/0217675 relates to a magnetic refrigeration device. In this case, the magnetocaloric material is introduced into a helical tube. It is possible for a plurality of helical regions to be connected in series, by virtue of the ends being joined to one another. The helical components may be filled with different magnetocaloric materials in order to cover a wide temperature range.

European patent application EP 09 167 550.4, which has an earlier priority date but was yet to be published at the priority date of the present application, filed Aug. 10, 2009, relates to heat exchanger beds composed of thermomagnetic material. It is stated that it is possible in packed heat exchanger beds to combine a series of different magnetocaloric materials with different Curie temperatures. This is said to allow a large temperature change overall to be achieved in a single heat exchanger bed. A preferable combination is said to be that of thermomagnetic materials with a maximum difference in the Curie temperature of 1 to 10° C., more preferably 2 to 6° C.

It is an object of the present invention to provide heat exchanger beds composed of a cascade of at least three different magnetocaloric materials with different Curie temperatures, which exhibit particularly good efficacy of the material cascade.

The object is achieved in accordance with the invention by a heat exchanger bed composed of a cascade of at least three different magnetocaloric materials with different Curie temperatures, which are arranged in succession by ascending or descending Curie temperature and are preferably insulated from one another by intermediate thermal and/or electrical insulators, the difference in the Curie temperatures of adjacent magnetocaloric materials being 0.5 to 6° C.

The object is also achieved by process for producing such heat exchanger beds, in which a powder of the particular thermomagnetic material is subjected to shaping to form the thermomagnetic materials, and then the materials are packed to form the heat exchanger bed, preferably alternating with thermal and/or electrical insulators, or they are embedded into a thermal and/or electrical insulator matrix.

BRIEF DESCRIPTION OF THE SEVERAL VIEWS OF THE DRAWINGS

FIG. 1: A cross section through a heat exchanger bed 1 containing 5 different magnetocaloric materials 2a to 2e which are insulated from one another by intermediate thermal and/or electrical insulators 3 thereby forming a layer sequence of several magnetocaloric material and insulators.

FIG. 2: A cross section through a heat exchanger bed 1 containing 5 monoliths of magnetocaloric materials 2 embedded in a matrix of thermal and/or electrical insulator 3 which have several continuous channels 4.

FIG. 3A: A front view of a heat exchanger bed 1 comprising of a plurality of parallel sheets of the same magnetocaloric material 2a. The fluid flows through the gaps between the sheets.

FIG. 3B: A side view of the heat exchanger bed 1 wherein 5 different magnetocaloric materials 2a to 2e are arranged which are insulated from one another by intermediate thermal and/or electrical insulators 3.

FIG. 3C: A top view of the heat exchanger bed 1 showing the arrangement of the five different magnetocaloric materials 2a to 2e.

It has been found in accordance with the invention that the cascade of the different magnetocaloric materials can be operated particularly advantageously when the difference in the Curie temperatures of adjacent magnetocaloric materials is 0.5 to 6° C., preferably 0.5 to 4° C., more preferably 1.5 to 2.5° C., particularly 1.8 to 2.2° C., especially about 2.0° C.

In the heat exchanger bed, at least three different magnetocaloric materials may be present, preferably 5 to 50 different magnetocaloric materials, especially 10 to 30 different magnetocaloric materials.

The number of magnetocaloric materials can be guided by the practical requirements and apparatus features. A relatively large number of different magnetocaloric materials can exploit a relatively wide temperature range.

According to the invention, the magnetocaloric materials are arranged in sequence and are preferably insulated from one another by intermediate thermal and/or electrical insulators. They are preferably thermal insulators, especially simultaneously thermal and electrical insulators.

Apart from the thermal and/or electrical insulators preferably used, the different magnetocaloric materials are preferably in direct spatial contact with one another, such that no different apparatuses connected to one another by conduits are present, for example according to FIG. 7A of EP-A-1 736 717.

The materials are additionally not present in helical form, as according to US 2009/0217675.

The three-dimensional form of the individual different magnetocaloric materials can be selected as desired. They may be packed beds of particles of the magnetocaloric materials. Alternatively, they may be stacked plates or monoliths which have continuous channels through which the heat exchange medium can flow. Suitable geometries are described below.

The beds of the individual materials, or stacks of plates or monoliths of the individual materials, are combined to give the inventive cascade, either by bonding them directly to one another or stacking them one on top of another, or separating them from one another by intermediate thermal and/or electrical insulators.

The thermal and/or electrical insulators may be selected from any suitable materials. Suitable materials combine a low thermal conductivity with a low electrical conductivity and prevent the occurrence of eddy currents, the cross-contamination of the different magnetocaloric materials by constituents of the adjacent magnetocaloric materials, and heat losses owing to thermal conduction from the hot side to the cold side. The insulators preferably combine a high mechanical strength with good electrical and thermal insulating action. Examples of suitable materials are engineering plastics such as PEEK, PSU, PES, liquid-crystalline polymers and multilayer composite materials, carbon fibers and meshes, ceramics, inorganic oxides, glasses, semiconductors and combinations thereof.

The insulators are more preferably formed from carbon fibers.

The thermal and/or electrical insulators advantageously have a high mechanical strength, as, for example, in the case of engineering plastics, multilayer composite materials, carbon fibers and carbon fiber meshes. This allows reduction or absorption of the mechanical stresses in the bed, which result from the cycle of introduction into and removal from the magnetic field. In the course of introduction into the magnetic field and removal from the magnetic field, the forces acting on the magnetocaloric material may be considerable owing to the strong magnets.

Adjacent magnetocaloric materials preferably have a separation of 0.05 to 3 mm, more preferably 0.1 to 0.5 mm. The intermediate space between the magnetocaloric materials is preferably filled by the thermal and/or electrical insulators to an extent of at least 90%, preferably completely.

In one embodiment of the invention, the thermal and/or electrical insulators form a matrix into which the magnetocaloric materials are embedded. This means that each of the magnetocaloric materials and also the cascade of the magnetocaloric materials overall are completely surrounded by the insulator material. The thickness of the insulator material surrounding the cascade (layer thickness) is preferably 0.5 to 10 mm, more preferably 1 to 5 mm.

The heat exchanger bed may otherwise be formed from the magnetocaloric materials in any suitable manner. It may, for example, be a packed heat exchanger bed composed of individual thermomagnetic material particles, but may also comprise one or more monoliths or comprise plates of the thermomagnetic materials which have a given separation from one another.

Stacks of heat exchanger beds or monoliths can preferably be thermally insulated from one another by appropriate intermediate layers, for example by carbon screens. This allows heat losses resulting from thermal conduction in the material to be prevented. By virtue of an appropriate design, the intermediate layers may also serve to simultaneously distribute the heat exchanger medium.

The packed heat exchanger bed is preferably formed from thermomagnetic material particles which have a mean diameter in the range from 50 µm to 1 mm and give rise to a porosity in the packed bed in the range from 30 to 45%.

The porosity is defined as the proportion by volume of empty space (interstices) in the heat exchanger bed.

The heat exchanger bed can be produced by a process in which a powder of the thermomagnetic material is subjected to shaping to form the thermomagnetic material particles and the material particles are subsequently packed to form the heat exchanger bed.

In a heat exchanger bed composed of a thermomagnetic material monolith, the former preferably has continuous channels with a cross-sectional area of the individual channels in the range from 0.001 to 0.2 $mm^2$ and a wall thickness of 50 to 300 µm, a porosity in the range from 10 to 60% and a ratio of surface to volume in the range from 3000 to 50 000 $m^2/m^3$.

Alternatively, the thermomagnetic material monolith may comprise or be formed from a plurality of parallel sheets with a sheet thickness of 0.1 to 2 mm, preferably 0.5 to 1 mm, and a plate separation (interstice) of 0.05 to 1 mm, preferably 0.05 to 0.2 mm. The number of sheets may, for example, be 5 to 100, preferably 10 to 50.

The heat exchanger bed is produced, for example, by extrusion, injection molding or molding of the thermomagnetic material to form the monolith.

The object is additionally achieved by the use of a heat exchanger bed as defined above in refrigerators, air conditioning units, heat pumps or in power generation by direct conversion of heat.

A packed heat exchanger bed composed of thermomagnetic material particles is a highly efficient material geometry which allows optimal operation of the heat exchanger bed when the thermomagnetic material particles have a mean diameter in the range from 50 µm to 1 mm and there is a porosity in the packed bed in the range from 30 to 45%. The individual material particles may have any desired form. The material particles are preferably in spherical form, pellet form, sheet form or cylinder form. The material particles are more preferably in spherical form. The diameter of the material particles, especially of the spheres, is 50 µm to 1 mm, more preferably 200 to 400 µm. The material particles, especially spheres, may have a size distribution. The size distribution is preferably narrow, such that predominantly spheres of one size are present. The diameter preferably differs from the mean diameter by not more than 20%, more preferably by not more than 10%, especially by not more than 5%.

In the packed bed, this results in a porosity in the range from 30 to 45%, more preferably from 36 to 40%.

Material particles, especially spheres with the above dimensions, as a packed heat exchanger bed, give high heat transfer coefficients between solid and fluid (heat exchanger fluid), the pressure drop being small to low. This allows an improved coefficient of performance (COP) of the heat exchanger bed. The high heat transfer coefficient allows the packed beds to be operated at higher frequencies than customary, and hence allows greater energy extraction.

For the particular operating conditions, the performance of the packed heat exchanger bed can be optimized by using material particles, especially spheres, of different diameter. A lower diameter, especially sphere diameter, leads to a higher coefficient of heat transfer and hence allows better heat exchange. This, however, is associated with a higher pressure drop through the heat exchanger bed. Conversely, the use of larger material particles, especially spheres, leads to slower heat transfer, but to lower pressure drops.

The packed heat exchanger bed composed of the thermomagnetic material particles can be produced in any suitable manner. The thermomagnetic material particles are first produced, for example by shaping a powder of the thermoelectric material to form the thermomagnetic material particles. Subsequently, the material particles are packed to form the heat exchanger bed. This can be done by pouring the material particles into a suitable vessel, in which case the settling of the bed can be improved by shaking. Floating in a fluid with subsequent settling of the material particles is also possible. It is additionally possible to settle the individual material particles in a controlled manner to form a homogeneous structure. In this case, it is possible, for example, to achieve a tight cubic packing of spheres.

The movement resistance of the packed heat exchanger bed can be achieved by any suitable measures. For example, the vessel in which the packed heat exchanger bed is present can be closed on all sides. This can be done, for example, using a mesh cage. In addition, it is possible to join the individual material particles to one another, for example by surface melting of the material particles in the packed bed or by sintering the material particles to one another in the packed bed. The surface melting or sintering should be effected such that the interstices between the material particles are very substantially preserved.

The formation of the packed heat exchanger bed by thermomagnetic material particles in sheet, cylinder, pellet or sphere form or similar form is advantageous, since a large ratio of surface to mass is achieved therewith. This achieves an improved heat transfer rate coupled with relatively low pressure drop.

A second advantageous embodiment of the heat exchanger bed is a thermomagnetic material monolith which has continuous channels. The monolith can be considered as a block of thermomagnetic material, in which case two opposite end sides of the block have entry and exit orifices for a fluid which are connected by channels which run through the entire monolith. Corresponding monoliths can be derived, for example, from a tube bundle in which the individual tubes of thermomagnetic material are joined to one another. The channels are preferably parallel to one another and generally run through the monoliths in a straight line. When particular use requirements are made, it is also possible to provide a curved profile of the channels. Corresponding monolith forms are known, for example, from automotive exhaust gas catalysts. The thermomagnetic material monoliths may thus have, for example, a cellular form, in which case the individual cells may have any desired geometry. For example, the channels may have a hexagonal cross section as in the case of a honeycomb, or a rectangular cross section. Star-shaped cross sections, round cross sections, oval cross sections or other cross sections are also possible in accordance with the invention, provided that the following conditions are observed:

cross-sectional area of the individual channels in the range from 0.001 to 0.2 mm², more preferably 0.01 to 0.03 mm², especially 0.015 to 0.025 mm² wall thickness of 50 to 300 µm, more preferably 50-150 µm, especially 85 to 115 µm porosity in the range from 10 to 60%, more preferably 15 to 35%, especially 20 to 30% ratio of surface to volume in the range from 3000 to 50 000 m²/m³, more preferably 5000 to 15 000 m²/m³.

The individual channels may have, for example, with a rectangular cross section, cross-sectional dimensions of 50 µm×25 µm to 600 µm×300 µm, especially about 200 µm×100 µm. The wall thickness may especially preferably be about 100 µm. The porosity may more preferably be about 25%. The porosity is thus typically significantly lower than the porosity of a packed sphere bed. This allows more magnetocaloric material to be introduced into a given volume of the magnetic field. This leads to a greater thermal effect with equal expenditure to provide the magnetic field.

The shaped bodies have continuous channels. This allows a liquid heat carrier medium to flow through, such as water, water/alcohol mixtures, water/salt mixtures or gases such as air or noble gases. Preference is given to using water or water/alcohol mixtures, in which case the alcohol may be a mono- or polyhydric alcohol. For example, the alcohols may be glycols.

The monoliths may be formed, for example, from layers of magnetocaloric material with thin parallel channels in the layers.

The very large ratio of surface to volume allows excellent heat transfer, coupled with a very low pressure drop. The pressure drop is, for instance, one order of magnitude lower than for a packed bed of spheres which has the identical heat transfer coefficient. The monolith form thus allows the coefficient of performance (COP), for example of a magnetocaloric cooling device, to be improved considerably once again.

The thermomagnetic material itself may be selected from any suitable thermomagnetic materials. Suitable materials are described in a multitude of documents, for example in WO 2004/068512.

Preferred thermomagnetic materials are selected from (1) compounds of the general formula (I)

$$(A_yB_{1-y})_{2+\delta}C_wD_xE_z \qquad (I)$$

where

A is Mn or Co,

B is Fe, Cr or Ni,

C, D and E at least two of C, D and E are different, have a non-vanishing concentration and are selected from P, B, Se, Ge, Ga, Si, Sn, N, As and Sb, where at least one of C, D and E is Ge or Si, δ is a number in the range from −0.1 to 0.1, w, x, y, z are numbers in the range from 0 to 1, where w+x+z=1;

(2) La- and Fe-based compounds of the general formulae (II) and/or (III) and/or (IV)

$$La(Fe_xAl_{1-x})_{13}H_y \text{ or } La(Fe_xSi_{1-x})_{13}H_y \qquad (II)$$

where x is a number from 0.7 to 0.95, y is a number from 0 to 3, preferably from 0 to 2;

$$La(Fe_xAl_yCo_z)_{13} \text{ or } La(Fe_xSi_yCo_z)_{13} \qquad (III)$$

where x is a number from 0.7 to 0.95, y is a number from 0.05 to 1−x, z is a number from 0.005 to 0.5;

$$LaMn_xFe_{2-x}Ge \qquad (IV)$$

where x is a number from 1.7 to 1.95 and (3) Heusler alloys of the MnTP type where T is a transition metal and P is a p-doping metal having an electron count per atom e/a in the range from 7 to 8.5, (4) Gd- and Si-based compounds of the general formula (V)

$$Gd_5(Si_xGe_{1-x})_4 \quad (V)$$

where x is a number from 0.2 to 1,
(5) Fe$_2$P-based compounds,
(6) manganites of the perovskite type,
(7) compounds which comprise rare earth elements and are of the general formulae (VI) and (VII)

$$Tb_5(Si_{4-x}Ge_x) \quad (VI)$$

where x=0, 1, 2, 3, 4, $$XTiGe \quad (VII)$$

where X=Dy, Ho, Tm,
(8) Mn- and Sb- or As-based compounds of the general formulae (VIII) and (IX)

$$Mn_{2-x}Z_xSb \quad (VIII)$$

$$Mn_2Z_xSb_{1-x} \quad (IX)$$

where
Z is Cr, Cu, Zn, Co, V, As, Ge,
x is from 0.01 to 0.5,
where Sb may be replaced by As when Z is not As.

It has been found in accordance with the invention that the aforementioned thermomagnetic materials can be used advantageously in heat exchangers, magnetic cooling, heat pumps or thermomagnetic generators or regenerators when they have an inventive structure.

Particular preference is given in accordance with the invention to the metal-based materials selected from compounds (1), (2) and (3), and also (5).

Materials particularly suitable in accordance with the invention are described, for example, in WO 2004/068512, Rare Metals, Vol. 25, 2006, pages 544 to 549, J. Appl. Phys. 99,08Q107 (2006), Nature, Vol. 415, Jan. 10, 2002, pages 150 to 152 and Physica B 327 (2003), pages 431 to 437.

In the aforementioned compounds of the general formula (I), C, D and E are preferably identical or different and are selected from at least one of P, Ge, Si, Sn and Ga.

The thermomagnetic material of the general formula (I) is preferably selected from at least quaternary compounds which, as well as Mn, Fe, P and optionally Sb, additionally comprise Ge or Si or As or Ge and Si, Ge and As or Si and As, or Ge, Si and As.

Preferably at least 90% by weight, more preferably at least 95% by weight, of component A is Mn. More preferably at least 90% by weight, more preferably at least 95% by weight, of B is Fe. Preferably at least 90% by weight, more preferably at least 95% by weight, of C is P. Preferably at least 90% by weight, more preferably at least 95% by weight, of D is Ge. Preferably at least 90% by weight, more preferably at least 95% by weight, of E is Si.

The material preferably has the general formula MnFe($P_wGe_xSi_z$).

x is preferably a number in the range from 0.3 to 0.7, w is less than or equal to 1−x and z corresponds to 1−x−w.

The material preferably has the crystalline hexagonal Fe$_2$P structure. Examples of suitable materials are MnFeP$_{0.45\ to\ 0.7}$, Ge$_{0.55\ to\ 0.30}$ and MnFeP$_{0.5\ to\ 0.70}$, (Si/Ge)$_{0.5\ to\ 0.30}$.

Suitable compounds are additionally $M_{n1+x}Fe_{1-x}P_{1-y}Ge_y$ with x in the range from −0.3 to 0.5, y in the range from 0.1 to 0.6. Likewise suitable are compounds of the general formula $Mn_{1+x}Fe_{1-x}P_{1-y}Ge_{y-z}Sb_z$ with x in the range from −0.3 to 0.5, y in the range from 0.1 to 0.6 and z less than y and less than 0.2. Also suitable are compounds of the formula $Mn_{1+x}Fe_{1-x}P_{1-y}Ge_{y-z}Si_z$ with x in the range from 0.3 to 0.5, y in the range from 0.1 to 0.66, z less than or equal to y and less than 0.6.

Also suitable are further Fe$_2$P-based compounds proceeding from Fe$_2$P and FeAs$_2$, optionally Mn and P. They correspond, for example, to the general formulae MnFe$_{1-x}$Co$_x$Ge, where x=0.7-0.9, Mn$_{5-x}$Fe$_x$Si$_3$ where x=0-5, Mn$_5$Ge$_{3-x}$Si$_x$ where x=0.1-2, Mn$_5$Ge$_{3-x}$Sb$_x$ where x=0-0.3, Mn$_{2-x}$Fe$_x$Ge$_2$ where x=0.1-0.2, Mn$_{3-x}$Co$_x$GaC where x=0-0.05.

Preferred La- and Fe-based compounds of the general formulae (II) and/or (III) and/or (IV) are La(Fe$_{0.90}$Si$_{0.10}$)$_{13}$, La(Fe$_{0.89}$Si$_{0.11}$)$_{13}$, La(Fe$_{0.88}$Si$_{0.120}$)$_{13}$, La(Fe$_{0.877}$Si$_{0.123}$)$_{13}$, LaFe$_{11.8}$Si$_{1.2}$, La(Fe$_{0.88}$Si$_{0.12}$)$_{13}$H$_{0.5}$, La(Fe$_{0.88}$Si$_{0.12}$)$_{13}$H$_{1.0}$, LaFe$_{11.7}$Si$_{1.3}$H$_{1.1}$, LaFe$_{11.57}$Si$_{1.43}$H$_{1.3}$, La(Fe$_{0.88}$Si$_{0.12}$)H$_{1.5}$, LaFe$_{11.2}$Co$_{0.7}$Si$_{1.1}$, LaFe$_{11.5}$Al$_{1.5}$C$_{0.1}$, LaFe$_{11.5}$Al$_{1.5}$C$_{0.2}$, LaFe$_{11.5}$Al$_{1.5}$C$_{0.4}$, LaFe$_{11.5}$Al$_{1.5}$Co$_{0.5}$, La(Fe$_{0.94}$Co$_{0.06}$)$_{11.83}$Al$_{1.17}$, La(Fe$_{0.92}$Co$_{0.08}$)$_{11.83}$Al$_{1.17}$.

Suitable manganese-comprising compounds are MnFeGe, MnFe$_{0.9}$Co$_{0.1}$Ge, MnFe$_{0.8}$Co$_{0.2}$Ge, MnFe$_{0.7}$Co$_{0.3}$Ge, MnFe$_{0.6}$Co$_{0.4}$Ge, MnFe$_{0.5}$Co$_{0.5}$Ge, MnFe$_{0.4}$Co$_{0.6}$Ge, MnFe$_{0.3}$Co$_{0.7}$Ge, MnFe$_{0.2}$Co$_{0.8}$Ge, MnFe$_{0.15}$Co$_{0.85}$Ge, MnFe$_{0.1}$Co$_{0.9}$Ge, MnCoGe, Mn$_5$Ge$_{2.5}$Si$_{0.5}$, Mn$_5$Ge$_2$Si, Mn$_5$Ge$_{1.5}$Si$_{1.5}$, Mn$_5$GeSi$_2$, Mn$_5$Ge$_3$, Mn$_5$Ge$_{2.9}$Sb$_{0.1}$, Mn$_5$Ge$_{2.5}$Sb$_{0.2}$, Mn$_5$Ge$_{2.7}$Sb$_{0.3}$, LaMn$_{1.9}$Fe$_{0.1}$Ge, LaMn$_{1.85}$Fe$_{0.15}$Ge, LaMn$_{1.8}$Fe$_{0.2}$Ge, (Fe$_{0.9}$Mn$_{0.1}$)$_3$C, (Fe$_{0.8}$Mn$_{0.2}$)$_3$C, (Fe$_{0.7}$Mn$_{0.3}$)$_3$C, Mn$_3$GaC, MnAs, (Mn,Fe)As, Mn$_{1+\delta}$As$_{0.8}$Sb$_{0.2}$, MnAs$_{0.75}$Sb$_{0.25}$, Mn$_{1.1}$As$_{0.75}$Sb$_{0.25}$, Mn$_{1.5}$As$_{0.75}$Sb$_{0.25}$.

Heusler alloys suitable in accordance with the invention are, for example, Ni$_2$MnGa, Fe$_2$MnSi$_{1-x}$Ge$_x$ with x=0-1 such as Fe$_2$MnSi$_{0.5}$Ge$_{0.5}$, Ni$_{52.9}$Mn$_{22.4}$Ga$_{24.7}$, Ni$_{50.9}$Mn$_{24.7}$Ga$_{24.4}$, Ni$_{55.2}$Mn$_{18.6}$Ga$_{26.2}$, Ni$_{51.6}$Mn$_{24.7}$Ga$_{23.8}$, Ni$_{52.7}$Mn$_{23.9}$Ga$_{23.4}$, CoMnSb, CoNb$_{0.2}$Mn$_{0.8}$Sb, CoNb$_{0.4}$Mn$_{0.6}$SB, CoNb$_{0.6}$Mn$_{0.4}$Sb, Ni$_{50}$Mn$_{35}$Sn$_{15}$, Ni$_{50}$Mn$_{37}$Sn$_{13}$, MnFeP$_{0.45}$As$_{0.55}$, MnFeP$_{0.47}$As$_{0.53}$, Mn$_{1.1}$Fe$_{0.9}$P$_{0.47}$As$_{0.53}$, MnFeP$_{0.89-x}$Si$_x$Ge$_{0.11}$, x=0.22, x=0.26, x=0.30, x=0.33.

Additionally suitable are Fe$_{90}$Zr$_{10}$, Fe$_{82}$Mn$_8$Zr$_{10}$, Co$_{66}$Nb$_9$Cu$_1$Si$_{12}$B$_{12}$, Pd$_{40}$Ni$_{22.5}$Fe$_{17.5}$P$_{20}$, FeMoSiBCuNb, Gd$_{70}$Fe$_{30}$, GdNiAl, NdFe$_{12}$B$_6$GdMn$_2$.

Manganites of the perovskite type are, for example, La$_{0.6}$Ca$_{0.4}$MnO$_3$, La$_{0.67}$Ca$_{0.33}$MnO$_3$, La$_{0.8}$Ca$_{0.2}$MnO$_3$, La$_{0.7}$Ca$_{0.3}$MnO$_3$, La$_{0.958}$Li$_{0.025}$Ti$_{0.1}$Mn$_{0.9}$O$_3$, La$_{0.65}$Ca$_{0.35}$Ti$_{0.1}$Mn$_{0.9}$O$_3$, La$_{0.799}$Na$_{0.199}$MnO$_{2.97}$, La$_{0.88}$Na$_{0.099}$Mn$_{0.977}$O$_3$, La$_{0.877}$K$_{0.096}$Mn$_{0.974}$O$_3$, La$_{0.65}$Sr$_{0.35}$Mn$_{0.95}$Cn$_{0.05}$O$_3$, La$_{0.7}$Nd$_{0.1}$Na$_{0.2}$MnO$_3$, La$_{0.5}$Ca$_{0.3}$Sr$_{0.2}$MnO$_3$.

Gd- and Si-based compounds of the general formula (V)

$$Gd_5(Si_xGe_{1-x})_4$$

where x is a number from 0.2 to 1 are, for example, Gd$_5$(Si$_{0.5}$Ge$_{0.5}$)$_4$, Gd$_5$(Si$_{0.425}$Ge$_{0.575}$)$_4$, Gd$_5$(Si$_{0.45}$Ge$_{0.55}$)$_4$, Gd$_5$(Si$_{0.365}$Ge$_{0.635}$)$_4$, Gd$_5$(Si$_{0.3}$Ge$_{0.7}$)$_4$, Gd$_5$(Si$_{0.25}$Ge$_{0.75}$)$_4$.

Compounds comprising rare earth elements are Tb$_5$(Si$_{4-x}$Ge$_x$) with x=0, 1, 2, 3, 4 or XTiGe with X=Dy, Ho, Tm, for example Tb$_5$Si$_4$, Tb$_5$(Si$_3$Ge), Tb(Si$_2$Ge$_2$), Tb$_5$Ge$_4$, DyTiGe, HoTiGe, TmTiGe.

Mn- and Sb- or As-based compounds of the general formulae (VIII) and (IX) preferably have the definitions of z=0.05 to 0.3, Z=Cr, Cn, Ge, As, Co.

The thermomagnetic materials used in accordance with the invention can be produced in any suitable manner.

The thermomagnetic materials are produced, for example, by solid phase reaction of the starting elements or starting alloys for the material in a ball mill, subsequent pressing, sintering and heat treatment under inert gas atmosphere and subsequent slow cooling to room temperature. Such a process is described, for example, in J. Appl. Phys. 99, 2006, 08Q107.

Processing via melt spinning is also possible. This makes possible a more homogeneous element distribution which leads to an improved magnetocaloric effect; cf. Rare Metals, Vol. 25, October 2006, pages 544 to 549. In the process described there, the starting elements are first induction-melted in an argon gas atmosphere and then sprayed in the molten state through a nozzle onto a rotating copper roller. There follows sintering at 1000° C. and slow cooling to room temperature.

In addition, reference may be made to WO 2004/068512 for the production. However, the materials obtained by these processes frequently exhibit high thermal hysteresis. For example, in compounds of the $Fe_2P$ type substituted by germanium or silicon, large values for thermal hysteresis are observed within a wide range of 10 K or more. According to the invention, the magnetocaloric materials preferably have a low thermal hysteresis of less than 5° C., more preferably of less than 3° C., especially of less than 2° C.

The thermal hysteresis can be reduced significantly and a large magnetocaloric effect can be achieved when the metal-based materials are not cooled slowing to ambient temperature after the sintering and/or heat treatment, but rather are quenched at a high cooling rate. This cooling rate is at least 100 K/s. The cooling rate is preferably from 100 to 10 000 K/s, more preferably from 200 to 1300 K/s. Especially preferred cooling rates are from 300 to 1000 K/s.

The quenching can be achieved by any suitable cooling processes, for example by quenching the solid with water or aqueous liquids, for example cooled water or ice/water mixtures. The solids can, for example, be allowed to fall into ice-cooled water. It is also possible to quench the solids with subcooled gases such as liquid nitrogen. Further processes for quenching are known to those skilled in the art. What is advantageous here is controlled and rapid cooling.

The rest of the production of the thermomagnetic materials is less critical, provided that the last step comprises the quenching of the sintered and/or heat-treated solid at the inventive cooling rate. The process may be applied to the production of any suitable thermomagnetic materials for magnetic cooling, as described above.

In step (a) of the process, the elements and/or alloys which are present in the later thermomagnetic material are converted in a stoichiometry which corresponds to the thermomagnetic material in the solid or liquid phase.

Preference is given to performing the reaction in stage a) by combined heating of the elements and/or alloys in a closed vessel or in an extruder, or by solid phase reaction in a ball mill. Particular preference is given to performing a solid phase reaction, which is effected especially in a ball mill. Such a reaction is known in principle; cf. the documents cited above. Typically, powders of the individual elements or powders of alloys of two or more of the individual elements which are present in the later thermomagnetic material are mixed in pulverulent form in suitable proportions by weight. If necessary, the mixture can additionally be ground in order to obtain a microcrystalline powder mixture. This powder mixture is preferably heated in a ball mill, which leads to further comminution and also good mixing, and to a solid phase reaction in the powder mixture. Alternatively, the individual elements are mixed as a powder in the selected stoichiometry and then melted.

The combined heating in a closed vessel allows the fixing of volatile elements and control of the stoichiometry. Specifically in the case of use of phosphorus, this would evaporate easily in an open system.

The reaction is followed by sintering and/or heat treatment of the solid, for which one or more intermediate steps can be provided. For example, the solid obtained in stage a) can be subjected to shaping before it is sintered and/or heat treated.

Alternatively, it is possible to send the solid obtained from the ball mill to a melt-spinning process. Melt-spinning processes are known per se and are described, for example, in Rare Metals, Vol. 25, October 2006, pages 544 to 549, and also in WO 2004/068512. The high thermal hysteresis obtained in some case has already been mentioned.

In these processes, the composition obtained in stage a) is melted and sprayed onto a rotating cold metal roller. This spraying can be achieved by means of elevated pressure upstream of the spray nozzle or reduced pressure downstream of the spray nozzle. Typically, a rotating copper drum or roller is used, which can additionally be cooled if appropriate. The copper drum preferably rotates at a surface speed of from 10 to 40 m/s, especially from 20 to 30 m/s. On the copper drum, the liquid composition is cooled at a rate of preferably from $10^2$ to $10^7$ K/s, more preferably at a rate of at least $10^4$ K/s, especially with a rate of from 0.5 to $2 \times 10^6$ K/s.

The melt-spinning, like the reaction in stage a) too, can be performed under reduced pressure or under an inert gas atmosphere.

The melt-spinning achieves a high processing rate, since the subsequent sintering and heat treatment can be shortened. Specifically on the industrial scale, the production of the thermomagnetic materials thus becomes significantly more economically viable. Spray-drying also leads to a high processing rate. Particular preference is given to performing melt spinning.

Alternatively, in stage b), spray cooling can be carried out, in which a melt of the composition from stage a) is sprayed into a spray tower. The spray tower may, for example, additionally be cooled. In spray towers, cooling rates in the range from $10^3$ to $10^5$ K/s, especially about $10^4$ K/s, are frequently achieved.

The sintering and/or heat treatment of the solid is effected in stage c) preferably first at a temperature in the range from 800 to 1400° C. for sintering and then at a temperature in the range from 500 to 750° C. for heat treatment. For example, the sintering can then be effected at a temperature in the range from 500 to 800° C. For shaped bodies/solids, the sintering is more preferably effected at a temperature in the range from 1000 to 1300° C., especially from 1100 to 1300° C. The heat treatment can then be effected, for example, at from 600 to 700° C.

The sintering is performed preferably for a period of from 1 to 50 hours, more preferably from 2 to 20 hours, especially from 5 to 15 hours. The heat treatment is performed preferably for a period in the range from 10 to 100 hours, more preferably from 10 to 60 hours, especially from 30 to 50 hours. The exact periods can be adjusted to the practical requirements according to the materials.

In the case of use of the melt-spinning process, the period for sintering or heat treatment can be shortened significantly, for example to periods of from 5 minutes to 5 hours, preferably from 10 minutes to 1 hour. Compared to the otherwise customary values of 10 hours for sintering and 50 hours for heat treatment, this results in a major time advantage.

The sintering/heat treatment results in partial melting of the particle boundaries, such that the material is compacted further.

The melting and rapid cooling in stage b) thus allows the duration of stage c) to be reduced considerably. This also allows continuous production of the thermomagnetic materials.

The pressing can be carried out, for example, as cold pressing or as hot pressing. The pressing may be followed by the sintering process already described.

In the sintering process or sintered metal process, the powders of the thermomagnetic material are first converted to the desired shape of the shaped body, and then bonded to one another by sintering, which affords the desired shaped body. The sintering can likewise be carried out as described above.

It is also possible in accordance with the invention to introduce the powder of the thermomagnetic material into a polymeric binder, to subject the resulting thermoplastic molding material to a shaping, to remove the binder and to sinter the resulting green body. It is also possible to coat the powder of the thermomagnetic material with a polymeric binder and to subject it to shaping by pressing, if appropriate with heat treatment.

According to the invention, it is possible to use any suitable organic binders which can be used as binders for thermomagnetic materials. These are especially oligomeric or polymeric systems, but it is also possible to use low molecular weight organic compounds, for example sugars.

The thermomagnetic powder is mixed with one of the suitable organic binders and filled into a mold. This can be done, for example, by casting or injection molding or by extrusion. The polymer is then removed catalytically or thermally and sintered to such an extent that a porous body with monolith structure is formed.

Hot extrusion or metal injection molding (MIM) of the thermomagnetic material is also possible, as is construction from thin sheets which are obtainable by rolling processes. In the case of injection molding, the channels in the monolith have a conical shape, in order to be able to remove the moldings from the mold. In the case of construction from sheets, all channel walls can run in parallel.

The particular processes are controlled so as to result in heat exchanger beds which have a suitable combination of high heat transfer, low flow resistance and high magnetocaloric density. Preference is given to an optimal ratio of high magnetocaloric density and sufficient porosity, so as to ensure efficient heat removal and efficient heat exchange. In other words, the inventive shaped bodies exhibit a high ratio of surface to volume. By virtue of the high surface area, it is possible to transport large amounts of heat out of the material and to transfer them into a heat transfer medium. The structure should be mechanically stable in order to cope with the mechanical stresses by a fluid cooling medium. In addition, the flow resistance should be sufficiently low as to result in only a low pressure drop through the porous material. The magnetic field volume should preferably be minimized.

The different magnetocaloric materials having different Curie temperatures, which are used in accordance with the invention, can be obtained proceeding from a magnetocaloric material by varying individual constituents or the amounts of individual constituents. It is also possible to combine completely different magnetocaloric materials with one another, provided that the inventive sequence of the Curie temperatures is maintained.

The total difference in the Curie temperatures between the material with the highest Curie temperature and the material with the lowest Curie temperature is preferably 3 to 80° C., more preferably 10 to 50° C. For example, in a combination of five different materials with a Curie temperature difference of 2° C. between any two materials in the cascade, a temperature range of 8° C. may arise. Use of a plurality of materials with different Curie temperatures makes it possible to achieve a significantly greater temperature range than is possible using a single magnetocaloric material.

The heat exchanger beds obtained in accordance with the invention are preferably used in refrigerators, air conditioning units, heat pumps or heat exchangers, or in power generation by direct conversion of heat. The materials should exhibit a large magnetocaloric effect within a temperature range between −100° C. and +150° C.

The heat transfer rate limits the cycle speed and hence has a great influence on the power density.

In power generation, a coil of an electrically conductive material is arranged around the thermomagnetic material. In this coil, a current is induced through alteration of the magnetic field or of the magnetization, and can be used to perform electrical work. Preference is given to selecting the coil geometry and the geometry of the thermomagnetic material so as to result in a maximum energy yield with minimum pressure drop. The coil winding density (turns/length), the coil length, the charge resistance and the temperature change of the thermomagnetic material are important influencing parameters for the energy yield.

The thermomagnetic material is present in an external magnetic field. This magnetic field can be generated by permanent magnets or electromagnets. Electromagnets may be conventional electromagnets or superconductive magnets.

The thermomagnetic generator is preferably designed such that the thermal energy from geothermal sources or from the waste heat of industrial processes or from solar energy or solar collectors can be converted, for example, in photovoltaics. Specifically in regions with geothermal activity, the inventive thermomagnetic generator allows simple power generation exploiting geothermal heat. In industrial processes, process heat or waste heat frequently arises, which is typically discharged to the environment and is not utilized further. Wastewaters frequently also have a higher temperature on exit than on entry. The same applies to cooling water. The thermomagnetic generator thus allows the recovery of electrical energy from waste heat which is otherwise lost. By virtue of the fact that the thermomagnetic generator can be operated in the region of room temperature, it is possible to utilize this waste heat and to convert it to electrical energy. The energy conversion is effected preferably at temperatures in the range from 20 to 150° C., more preferably at temperatures in the range from 40 to 120° C.

In (concentrated) photovoltaic systems, high temperatures are frequently attained, such that it is necessary to cool. This heat to be removed can be converted to power in accordance with the invention.

For power generation, the thermomagnetic material is contacted alternately with a warm reservoir and a cool reservoir and hence subjected to a warming and cooling cycle. The cycle time is selected according to the particular technical prerequisites.

The examples which follow describe the production of thermomagnetic materials suitable for the inventive application and the design of monoliths and catalyst beds, and the production of an inventive cascade of magnetocaloric materials.

EXAMPLES

Example 1

Evacuated quartz ampoules which comprised pressed samples of MnFePGe were kept at 1100° C. for 10 hours in order to sinter the powder. This sintering was followed by heat treatment at 650° C. for 60 hours in order to bring about homogenization. Instead of slow cooling in the oven to room temperature, the samples were, however, immediately quenched in water at room temperature. The quenching in water caused a certain degree of oxidation at the sample surfaces. The outer oxidized shell was removed by etching with dilute acid. The XRD patterns showed that all samples crystallized in a structure of the $Fe_2P$ type.

The following compositions were obtained:
$Mn_{1.1}Fe_{0.9}P_{0.81}Ge_{0.19}$; $Mn_{1.1}Fe_{0.9}P_{0.78}Ge_{0.22}$, $Mn_{1.1}Fe_{0.9}P_{0.75}Ge_{0.25}$ and $Mn_{1.2}Fe_{0.8}P_{0.81}Ge_{0.19}$. The values observed for the thermal hysteresis are 7 K, 5 K, 2 K and 3 K for these samples in the given sequence. Compared to a slowly cooled sample, which has a thermal hysteresis of more than 10 K, the thermal hysteresis has been greatly reduced.

The thermal hysteresis was determined in a magnetic field of 0.5 tesla.

The Curie temperature can be adjusted by varying the Mn/Fe ratio and the Ge concentration, as can the value of the thermal hysteresis.

The change in the magnetic entropy, calculated from the direct current magnetization using the Maxwell relationship, for a maximum field change of from 0 to 2 tesla, is 14 J/kgK, 20 J/kgK and 12.7 J/kgK respectively for the first three samples.

The Curie temperature and the thermal hysteresis decrease with increasing Mn/Fe ratio. As a result, the MnFePGe compounds exhibit relatively large MCE values in a low field. The thermal hysteresis of these materials is very low.

Example 2

Melt-Spinning of MnFeP(GeSb)

The polycrystalline MnFeP(Ge,Sb) alloys were first produced in a ball mill with high energy input and by solid phase reaction methods, as described in WO 2004/068512 and J. Appl. Phys. 99,08 Q107 (2006). The material pieces were then introduced into a quartz tube with a nozzle. The chamber was evacuated to a vacuum of $10^{-2}$ mbar and then filled with high-purity argon gas. The samples were melted by means of a high frequency and sprayed through the nozzle owing to a pressure difference to a chamber containing a rotating copper drum. The surface speed of the copper wheel was adjustable, and cooling rates of about $10^5$ K/s were achieved. Subsequently, the spun ribbons were heat treated at 900° C. for one hour.

X-ray diffractometry reveals that all samples crystallize in the hexagonal $Fe_2P$ structure pattern. In contrast to samples not produced by the melt-spinning method, no smaller contaminant phase of MnO was observed.

The resulting values for the Curie temperature, the hysteresis and the entropy were determined for different peripheral speeds in the melt-spinning. The results are listed in Tables 1 and 2 which follow. In each case, low hysteresis temperatures were determined.

TABLE 1

| | V (m/s) | $T_C$ (K) | $\Delta T_{hys}$ (K) | $-\Delta S$(J/kgK) |
|---|---|---|---|---|
| Ribbons | | | | |
| $Mn_{1.2}Fe_{0.8}P_{0.73}Ge_{0.25}Sb_{0.02}$ | 30 | 269 | 4 | 12.1 |
| $Mn_{1.2}Fe_{0.8}P_{0.70}Ge_{0.20}Sb_{0.10}$ | 30 | 304 | 4.5 | 19.0 |
| | 45 | 314 | 3 | 11.0 |
| $MnFeP_{0.70}Ge_{0.20}Sb_{0.10}$ | 20 | 306 | 8 | 17.2 |
| | 30 | 340 | 3 | 9.5 |
| $MnFeP_{0.75}Ge_{0.25}$ | 20 | 316 | 9 | 13.5 |
| | 40 | 302 | 8 | — |

TABLE 1-continued

| | V (m/s) | $T_C$ (K) | $\Delta T_{hys}$ (K) | $-\Delta S$(J/kgK) |
|---|---|---|---|---|
| $Mn_{1.1}Fe_{0.9}P_{0.78}Ge_{0.22}$ | 20 | 302 | 5 | — |
| | 40 | 299 | 7 | — |
| $Mn_{1.1}Fe_{0.9}P_{0.75}Ge_{0.25}$ | 30 | 283 | 9 | 11.2 |
| $Mn_{1.2}Fe_{0.8}P_{0.75}Ge_{0.25}$ | 30 | 240 | 8 | 14.2 |
| $Mn_{1.1}Fe_{0.9}P_{0.73}Ge_{0.27}$ | 30 | 262 | 5 | 10.1 |
| Bulk | | | | |
| $MnFeP_{0.75}Ge_{0.25}$ | | 327 | 3 | 11.0 |
| $Mn_{1.1}Fe_{0.9}P_{0.81}Ge_{0.19}$ | | 260 | 7 | 14.0 |
| $Mn_{1.1}Fe_{0.9}P_{0.78}Ge_{0.22}$ | | 296 | 5 | 20.0 |
| $Mn_{1.1}Fe_{0.9}P_{0.75}Ge_{0.25}$ | | 330 | 2 | 13.0 |
| $Mn_{1.2}Fe_{0.8}P_{0.81}Ge_{0.19}$ | | 220 | 3 | 7.7 |
| $Mn_{1.2}Fe_{0.8}P_{0.75}Ge_{0.25}$ | | 305 | 3 | — |
| $Mn_{1.2}Fe_{0.8}P_{0.73}Ge_{0.27}$ | | 313 | 5 | — |
| $Mn_{1.3}Fe_{0.7}P_{0.78}Ge_{0.22}$ | | 203 | 3 | 5.1 |
| $Mn_{1.3}Fe_{0.7}P_{0.75}Ge_{0.25}$ | | 264 | 1 | — |

TABLE 2

| | $T_C$ (K) | $\Delta T_{hys}$ (K) | $-\Delta S$(J/kgK) |
|---|---|---|---|
| Bulk | | | |
| $MnFeP_{0.75}Ge_{0.25}$ | 327 | 3 | 11.0 |
| $Mn_{1.16}Fe_{0.84}P_{0.75}Ge_{0.25}$ | 330 | 5 | 22.5 |
| $Mn_{1.18}Fe_{0.82}P_{0.75}Ge_{0.25}$ | 310 | 3 | 16.1 |
| $Mn_{1.20}Fe_{0.80}P_{0.75}Ge_{0.25}$ | 302 | 1 | 12.0 |
| $Mn_{1.22}Fe_{0.78}P_{0.75}Ge_{0.25}$ | 276 | 4 | 11.7 |
| $Mn_{1.26}Fe_{0.74}P_{0.75}Ge_{0.25}$ | 270 | 1 | 8.5 |
| $Mn_{1.1}Fe_{0.9}P_{0.81}Ge_{0.19}$ | 260 | 6 | 13.8 |
| $Mn_{1.1}Fe_{0.9}P_{0.78}Ge_{0.22}$ | 296 | 4 | 20.0 |
| $Mn_{1.1}Fe_{0.9}P_{0.77}Ge_{0.23}$ | 312 | 2 | 14.6 |
| $Mn_{1.1}Fe_{0.9}P_{0.75}Ge_{0.25}$ | 329 | 2 | 13.0 |
| Ribbons | | | |
| $Mn_{1.20}Fe_{0.80}P_{0.75}Ge_{0.25}$ | 288 | 1 | 20.3 |
| $Mn_{1.22}Fe_{0.78}P_{0.75}Ge_{0.25}$ | 274 | 2 | 15.3 |
| $Mn_{1.24}Fe_{0.76}P_{0.75}Ge_{0.25}$ | 254 | 2 | 16.4 |
| $Mn_{1.26}Fe_{0.74}P_{0.75}Ge_{0.25}$ | 250 | 4 | 14.4 |
| $Mn_{1.30}Fe_{0.70}P_{0.75}Ge_{0.25}$ | 230 | 0 | 9.8 |

Example 3

A simple magnetocaloric regenerator formed from a packed or structured bed of a cascade of magnetocaloric materials a magnet arrangement and a heat transfer fluid was examined with the following results:

1. For given operating conditions:

| Form of the magnetocaloric material | Power (W) | Pressure drop (Pa) |
|---|---|---|
| Spheres, d = 0.3 mm | 160.5 | $1.8 \times 10^4$ |
| Spheres, d = 0.05 mm | 162.9 | $5.6 \times 10^5$ |
| Spheres, d = 0.03 mm | 163.0 | $1.52 \times 10^6$ |
| Monolith, channels with square cross section, side length 0.3 mm | 154.6 | $1.71 \times 10^3$ |
| Cylinder, d = h = 5 mm | Heat transfer too slow to build up a temperature gradient | |
| Cylinder, d = h = 0.5 mm | 154.3 | $9.11 \times 10^3$ |

It is evident that spheres of diameter 0.3 mm and the monolith give rise to good heat transfer performances, while only low pressure drops occurred (especially in the monolith).

2. For operation at different frequencies (all other operating conditions remaining the same):

The table which follows lists the net power (which is the cooling power minus the power required for the pumping of the heat transfer fluid) at different operating frequencies:

| Form of the magnetocaloric | Power at different operating frequencies (W) | | |
|---|---|---|---|
| material | 1 Hz | 5 Hz | 10 Hz |
| Monoliths, square channels, side length 0.1 mm | 153.2 | 645.2 | 1024.6 |
| Monoliths, square channels, side length 0.3 mm | 108.6 | 0* | 0* |
| Spheres, d = 0.05 mm | 96.1 | 522.2 | 986.1 |
| Spheres, d = 0.3 mm | 90.1 | 259.1 | 0* |

N.B.: 0* means that the power required for the pumping of the fluid is greater than the cooling power obtained.

Example 4

Heat Exchanger Bed Composed of a Cascade of at Least Five Magnetocaloric Materials By the process described in Example 1, five different magnetocaloric materials with Curie temperatures of 290.4 K, 293.1 K, 296.1 K, 299.1 K and 301.5 K were obtained. The temperature range was thus 11.1 K. the particular magnetocaloric materials were MnFePAs alloys of different composition.

The material was charged into a magnetocaloric material bed in the form of granules with a mean particle diameter of 300-450 μm. The material bed had a diameter of 15 mm and a bed length of 50 mm. The different magnetocaloric materials were arranged at a distance from one another, using a carbon mesh as a thermal and electrical insulator.

The packed bed of the magnetocaloric materials comprised the particular magnetocaloric material beds packed in succession, and was anchored at a fixed location.

In addition to the cascade of the magnetocaloric materials, a magnet was secured on an axis of rotation at right angles to the longitudinal axis of the magnetocaloric material bed. By rotating the magnet about its axis, the two poles of the magnet passed alternately over the magnetocaloric material cascade. The magnetic field strength between the magnets was 650 to 800 mT.

The rotatable magnet rotated with a rotation frequency of about 1 Hz.

Ethanol flowed through the magnetocaloric material as a heat carrier fluid, and the volume of the fluid pumped per magnet rotation was 1 to 5 ml. The temperature difference observed between the ends of the bed in the first pass was about 8 K.

Example 5

Simulation of a Cascade of 25 Magnetocaloric Materials

In a computer simulation, a cascade of 25 magnetocaloric materials with Curie temperatures of −2° C. to 46° C. and a difference in the Curie temperatures between two adjacent magnetocaloric materials of 2° C. was simulated.

The total weight of magnetocaloric material was 806 g, the total amount of fluid pumped through 29.1 g. The porosity of the heat exchanger bed was 25%. The thermal and electrical insulation had a thickness of 1 mm, and a lambda value of 0.15 W/m K was attained. At a magnet rotation frequency of 2 Hz, with a temperature range of 1° C. to 46° C. and an amount of fluid pumped of 12.8 ml per cycle, a cooling power of 186 W was calculated given the above assumptions.

Example 6

Simulation of the Importance of Sufficient Insulation Around the Magnetocaloric Bed The cascade of 25 magnetocaloric materials according to Example 5 was surrounded with insulation of thickness 1 mm and having a k value of 0.15 W/m K. This made it possible that a temperature profile of 1° C. to 46° C. built up through the magnetocaloric bed, and an average cooling power of 186 W was calculated.

When the insulation bed is formed from stainless steel with a k value of 16 W/m K, with a wall thickness of 1 mm without use of further insulation, the losses become so great that no temperature gradient can be built up in the magnetocaloric bed. The temperature gradient through the bed is calculated in this case to be only 0.3° C.

The invention claimed is:

1. A heat exchanger bed comprising a cascade comprising at least three different magnetocaloric materials having different Curie temperatures, which are arranged in succession by ascending or descending Curie temperature and are optionally insulated from one another by intermediate thermal and/or electrical insulators,
wherein the difference in the Curie temperatures of adjacent magnetocaloric materials is from 0.5 to 2.5° C.

2. The heat exchanger bed of claim 1, wherein the difference in the Curie temperatures of adjacent magnetocaloric materials is from 1.5 to 2.5° C.

3. The heat exchanger bed of claim 2, wherein the difference in the Curie temperatures of adjacent magnetocaloric materials is from 1.8 to 2.2° C.

4. The heat exchanger bed of claim 1, wherein 5 to 50 different magnetocaloric materials are present in the heat exchanger bed.

5. The heat exchanger bed of claim 1, wherein the thermal and/or electrical insulators are formed from an organic polymer, a ceramic, an inorganic oxide, carbon fibers or meshes, glasses, semiconductors, or any combination thereof.

6. The heat exchanger bed of claim 1, wherein the thermal and/or electrical insulators form a matrix into which the magnetocaloric materials are embedded.

7. The heat exchanger bed of claim 1, wherein adjacent magnetocaloric materials have a separation of 0.05 to 3 mm.

8. The heat exchanger bed of claim 1, wherein the magnetocaloric materials and thermal and/or electrical insulators form a layer sequence, the layer thickness of each of the magnetocaloric materials being from 1 to 100 mm.

9. The heat exchanger bed of claim 1, which is formed from thermomagnetic material monoliths of the different magnetocaloric materials, which have continuous channels, wherein the individual channels have a cross-sectional area in the range from 0.001 to 0.2 mm$^2$, a wall thickness of 50 to 300 μm, a porosity in the range from 10 to 60%, and a ratio of surface to volume in the range from 3000 to 50 000 m$^2$/m$^3$,
or
which have a plurality of parallel sheets with a sheet thickness of 0.1 to 2 mm and a sheet separation of 0.05 to 1 mm,
or
which is a packed heat exchanger bed composed of thermomagnetic material particles which have a mean diameter in the range from 50 μm to 1 mm and give rise to a porosity in the packed bed in the range from 30 to 45%.

10. The heat exchanger bed of claim 1, wherein the porosity of the magnetocaloric materials is 20 to 30%.

11. The heat exchanger bed of claim 9, wherein the cross-sectional area of the individual channels is from 0.01 to 0.03 mm$^2$ and the wall thickness is from 50 to 150 μm.

12. The heat exchanger bed of claim 1, wherein the thermomagnetic materials are selected from the group consisting of:

(1) a compound of formula (I):

$$(A_yB_{1-y})_{2+\delta}C_wD_xE_z \quad (I)$$

wherein
A is Mn or Co;
B is Fe, Cr, or Ni;
C, D and E at least two of C, D, and E are different, have a non-vanishing concentration and are selected from P, B, Se, Ge, Ga, Si, Sn, N, As, and Sb, wherein at least one of C, D, and E is Ge or Si;
δ is a number in the range from −0.1 to 0.1;
w, x, y, z are numbers in the range from 0 to 1, where w+x+z=1;

(2) La- and Fe compounds of formulae (II) and/or (III) and/or (IV):

$$La(Fe_xAl_{1-x})_{13}H_y \text{ or } La(Fe_xSi_{1-x})_{13}H_y \quad (II):$$

wherein
x is a number from 0.7 to 0.95; and
y is a number from 0 to 3;

$$La(Fe_xAl_yCo_z)_{13} \text{ or } La(Fe_xSi_yCo_z)_{13} \quad (III),$$

wherein
x is a number from 0.7 to 0.95;
y is a number from 0.05 to 1−x; and
z is a number from 0.005 to 0.5; and $$LaMn_xFe_{2-x}Ge \quad (IV),$$

wherein
x is a number from 1.7 to 1.95;

(3) a Heusler alloy of the MnTP type where T is a transition metal and P is a p-doping metal having an electron count per atom e/a in the range from 7 to 8.5;

(4) Gd- and Si compounds of the general formula (V):

$$Gd_5(Si_xGe_{1-x})_4 \quad (V),$$

wherein x is a number from 0.2 to 1;

(5) Fe$_2$P compounds;
(6) a manganite of the perovskite type;
(7) compounds comprising rare earth elements of formulae (VI) and (VII):

$$Tb_5(Si_{4-x}Ge_x) \quad (VI),$$

wherein x=0, 1, 2, 3, or 4; and $$XTiGe \quad (VII)$$

wherein X=Dy, Ho, or Tm; and (8) Mn- and Sb- or As compounds of formulae (VIII) and (IX):

$$Mn_{2-x}Z_xSb \quad (VIII),$$

$$Mn_2Z_xSb_{1-x} \quad (IX),$$

wherein
Z is Cr, Cu, Zn, Co, V, As, or Ge; and
x is from 0.01 to 0.5,
wherein Sb may be replaced by As when Z is not As.

13. The heat exchanger bed of claim 12, wherein the thermomagnetic material is a quaternary compound of formula (I) which comprises Mn, Fe, and P and optionally Sb, and further comprises Ge, Si, As, Ge and Si, Ge and As, Si and As, or Ge, Si, and As.

14. A process for producing the heat exchanger bed of claim 1, the process comprising:
shaping a powder of the thermomagnetic material, to form a shaped thermomagnetic material; and subsequently,
packing the shaped thermomagnetic material, to form the heat exchanger bed, optionally alternating with thermal and/or electrical insulators, or embedding them into a thermal and/or electrical insulator matrix.

15. A refrigerator, an air conditioning unit, or a heat pump, comprising the heat exchanger bed of claim 1.

* * * * *